United States Patent [19]

Kojima

[11] Patent Number: 4,925,162
[45] Date of Patent: May 15, 1990

[54] VIBRATION ISOLATING DEVICES

[75] Inventor: Hiroshi Kojima, Yokohama, Japan

[73] Assignee: Bridgestone Corporation, Tokyo, Japan

[21] Appl. No.: 412,534

[22] Filed: Sep. 22, 1989

Related U.S. Application Data

[63] Continuation of Ser. No. 207,938, Jun. 17, 1988, abandoned, which is a continuation of Ser. No. 32,971, Apr. 1, 1987, abandoned, which is a continuation of Ser. No. 816,649, Jan. 6, 1986, abandoned.

[51] Int. Cl.$^5$ .................... F16F 9/00; F16F 13/00; B60G 15/06
[52] U.S. Cl. .................... 267/140.1; 267/122; 267/219
[58] Field of Search .................... 267/140.1–141.3, 267/35, 64.11–64.28, 122, 123, 152, 153, 219, 220; 188/298, 320; 248/562, 636, 631; 123/192 R, 195 A, 192 B; 180/300, 312, 902

[56] References Cited

U.S. PATENT DOCUMENTS

| | | | |
|---|---|---|---|
| 2,919,883 | 1/1960 | Murphy | 267/122 X |
| 3,036,180 | 5/1962 | Greenwood | 267/122 X |
| 3,290,945 | 12/1966 | Yao Tzu Li et al. | 267/122 X |
| 4,401,298 | 8/1983 | Eaton et al. | 267/141.1 X |
| 4,416,445 | 11/1983 | Coad | 267/140.1 X |
| 4,420,060 | 12/1983 | Kakimoto | 267/140.1 X |
| 4,511,126 | 4/1985 | Bernuchon et al. | 267/140.1 |
| 4,583,723 | 4/1986 | Ozawa | 267/140.1 |
| 4,595,183 | 6/1986 | Dan et al. | 267/140.1 |
| 4,607,828 | 8/1986 | Bodin et al. | 267/140.1 |
| 4,630,808 | 12/1986 | Ushijima et al. | 267/140.1 |
| 4,641,808 | 2/1987 | Flower | 248/562 X |
| 4,650,169 | 3/1987 | Eberhard et al. | 267/140.1 |
| 4,651,980 | 3/1987 | Morita et al. | 267/140.1 |
| 4,653,734 | 3/1987 | Jördens | 267/140.1 X |
| 4,657,227 | 4/1987 | Hofmann | 267/140.1 X |
| 4,660,812 | 4/1987 | Dan et al. | 267/140.1 |
| 4,671,227 | 6/1987 | Hollerweger et al. | 248/636 X |
| 4,708,329 | 11/1987 | Tabata et al. | 267/219 X |
| 4,709,907 | 12/1987 | Thorn | 267/140.1 |
| 4,753,422 | 6/1988 | Thorn | 267/140.1 |
| 4,765,601 | 8/1988 | Miller et al. | 267/140.1 |
| 4,832,319 | 5/1989 | Noguchi et al. | 267/219 X |

FOREIGN PATENT DOCUMENTS

| | | | |
|---|---|---|---|
| 0133588 | 2/1985 | European Pat. Off. | 267/140.1 |
| 2802896 | 7/1979 | Fed. Rep. of Germany | 267/140.1 |
| 3140783 | 4/1983 | Fed. Rep. of Germany | 267/140.1 |
| 3142673 | 5/1983 | Fed. Rep. of Germany | 267/140.1 |
| 3421119 | 12/1985 | Fed. Rep. of Germany | 267/140.1 |
| 3638647 | 5/1987 | Fed. Rep. of Germany | 267/140.1 |
| 58-119643 | 8/1983 | Japan | |
| 0018633 | 1/1985 | Japan | 267/140.1 |
| 0040843 | 3/1985 | Japan | 267/140.1 |
| 0159435 | 8/1985 | Japan | 267/140.1 |
| 0172744 | 9/1985 | Japan | 267/140.1 |
| 0188638 | 9/1985 | Japan | 267/140.1 |
| 2165617 | 4/1986 | United Kingdom | 267/140.1 |

*Primary Examiner*—Douglas C. Butler
*Attorney, Agent, or Firm*—Sughrue, Mion, Zinn, Macpeak & Seas

[57] ABSTRACT

A vibration isolating device for use in an engine mount or the like is disclosed, which comprises a pair of frame bodies, an elastic member disposed between the two frame bodies, a partition member dividing a closed chamber into two liquid chambers, and at least one restricted passage arranged in the partition member. In the device of this type, the partition member is provided with a vibration insulating unit comprising a pair of flexible diaphragms and a perforated rigid plate sandwiched therebetween.

4 Claims, 4 Drawing Sheets

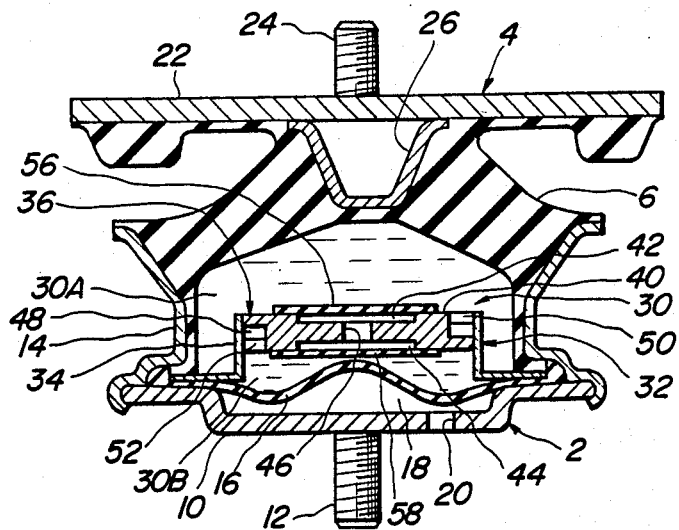
FIG_1
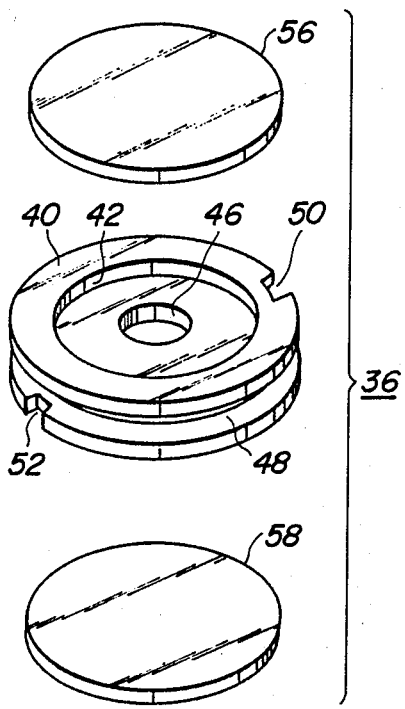
FIG_2
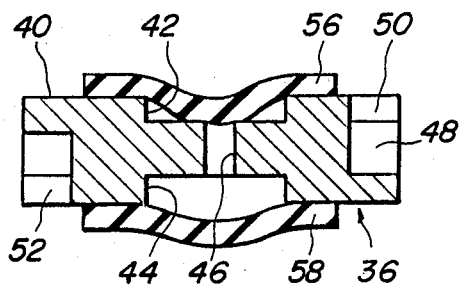
FIG_3
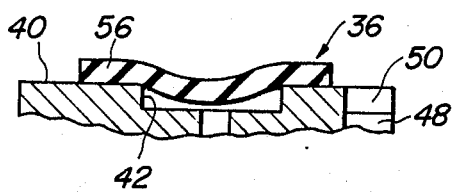
FIG_4

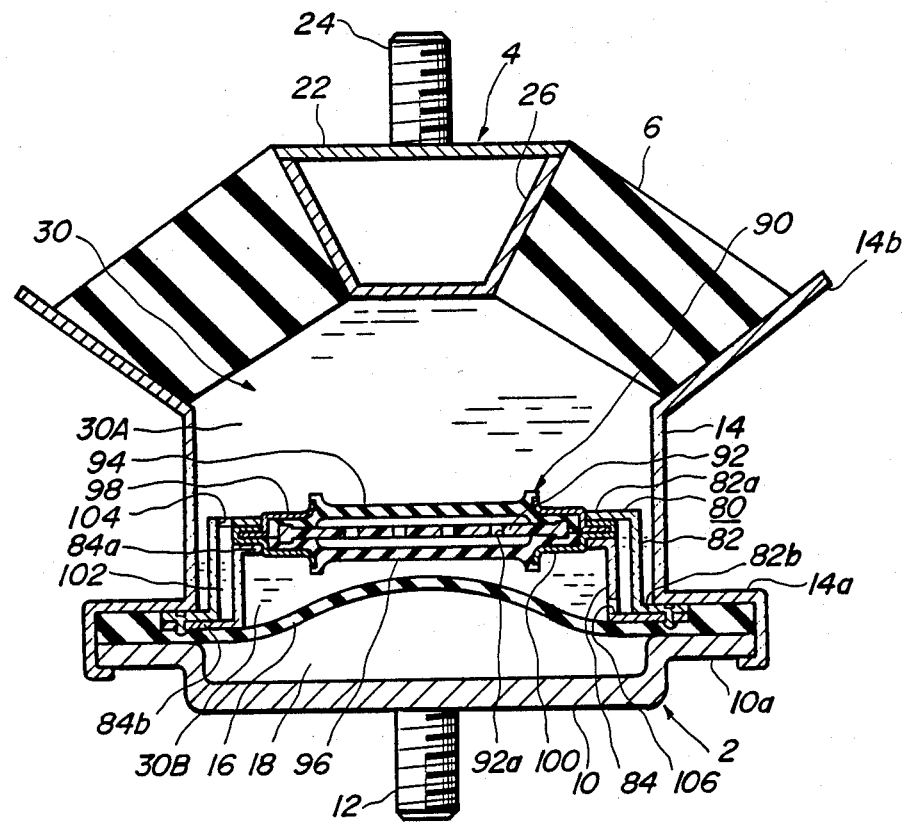
FIG_7
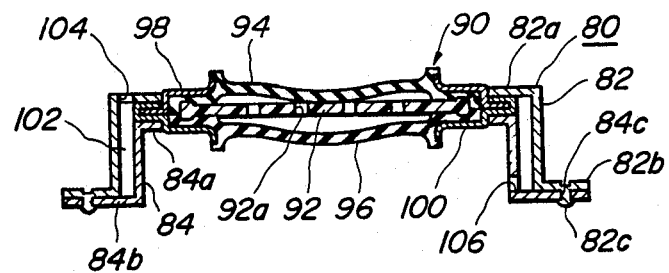
FIG_8

VIBRATION ISOLATING DEVICES

This is a continuation of application Ser. No. 207,938 filed Jun. 17, 1988, which is a continuation of application Ser. No. 032,971 filed Apr. 1, 1987, which is a continuation of application Ser. No. 816,649 filed Jan. 6, 1986, all now abandoned.

BACKGROUND OF THE INVENTION

1. Field of the Invention

This invention relates to a vibration isolating device suitable for use in automobile and other vehicles, machinery and the like, which serves to not only sufficiently damp low frequency, large amplitude vibrations but also effectively insulate high frequency, small amplitude vibrations from a vibration source.

2. Related Art Statement

The vibration isolating device generally called as a rubber vibration isolator is used, for instance, as an engine mount for automobile vehicles, whereby vibrations from an internal combustion engine are absorbed so as not to be transmitted to a vehicle chassis.

The vibration isolating device of this type comprises a frame body connected to a vehicle chassis, a frame body connected to an engine, an elastic member disposed between these frame bodies and contributing to the formation of a closed chamber, an incompressible liquid such as water or the like filled in the closed chamber, a partition member secured at its peripheral edge to one of the above two frame bodies and dividing the closed chamber into two small chambers, and a restricted passage arranged in the partition member and communicating the two small chambers with each other.

When vibrations from the engine are transmitted to the vibration isolating device, they can be damped by a flow resistance subjected to the liquid when the liquid flows from the one small chamber to the other through the restricted passage, a viscosity resistance of the liquid itself, an internal friction of the elastic member and the like.

In this vibration isolating device, however, when the vibration transmitted to the device is, for example, high frequency, small amplitude vibrations of not less than 50 Hz, the restricted passage is rendered into a clogged state under influences of viscosity resistance and inertia force of the liquid, friction force between the liquid and the restricted passage and the like. As a result, the rapid increase of dynamic spring rate in the device deteriorates considerably the ride comfortability on the vehicle.

SUMMARY OF THE INVENTION

It is, therefore, an object of the invention to advantageously solve the aforementioned problems of the prior art and to provide a vibration isolating device capable of effectively developing the conflicting properties between the damping of low frequency, large amplitude vibration and the insulation of high frequency, small amplitude vibration.

According to the invention, there is the provision of in a vibration isolating device comprising two frame bodies connecting to separate members, an elastic member disposed between the two frame bodies so as to form a closed chamber, an incompressible liquid filled in the closed chamber, a partition member secured at its peripheral edge to one of the two frame bodies and dividing the closed chamber into two small chambers, and at least one restricted passage arranged in the partition member so as to communicate the two small chambers with each other, the improvement wherein the partition member is provided with a vibration insulating unit comprising a pair of flexible diaphragms and a perforated rigid plate sandwiched therebetween.

In the preferred embodiment of the invention, the perforated rigid plate has at least one through-hole, and at least one of the flexible diaphragms is provided with at least one hole.

In the vibration isolating device according to the invention, when low frequency, large amplitude vibrations are transmitted to the device, the effective damping of such vibrations is attained mainly by the flow resistance and liquid column resonance subjected to the liquid flowing from one of the small chambers to the other through the restricted passage. On the other hand, when high frequency, small amplitude vibrations are transmitted to the device, sufficient insulation of such vibrations is attained by the deformation of the two flexible diaphragms in the vibration insulating unit based on the difference in pressure between the two small chambers.

BRIEF DESCRIPTION OF THE DRAWINGS

The invention will now be described with reference to the accompanying drawings, wherein:

FIG. 1 is a sectional view of a first embodiment of the vibration isolating device according to the invention;

FIG. 2 is an exploded perspective view of the vibration insulating unit used in the device of FIG. 1;

FIGS. 3 and 4 are partial enlarged views illustrating the operational state of the main part of the device according to the invention, respectively;

FIGS. 5, 6 and 7 are sectional views of second to fourth embodiments of the vibration isolating device according to the invention, respectively;

FIG. 8 is an enlarged sectional view illustrating the operational state of the partition member provided with the vibration insulating unit in the device of FIG. 7;

Like parts are designated by like numerals through the different figures of the drawing.

DESCRIPTION OF THE PREFERRED EMBODIMENTS

Figure 5:
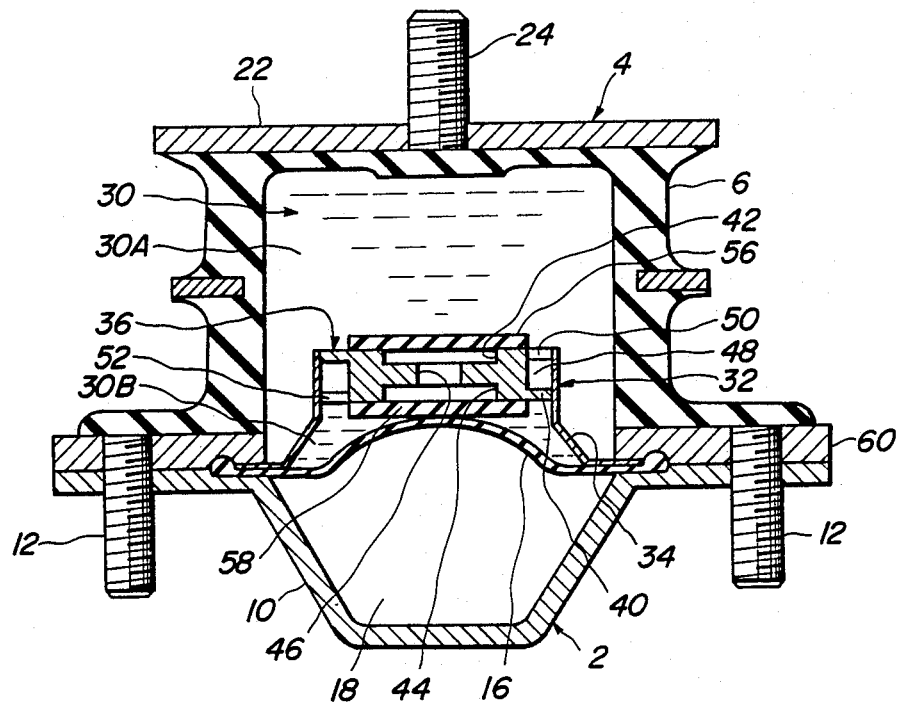

In FIG. 1 is sectionally shown a first embodiment of the vibration isolating device provided with the vibration insulating unit according to the invention, which is used as an engine mount for automobile vehicle.

This vibration isolating device comprises a frame body 2 connecting to a vehicle chassis (not shown), a frame body 4 connecting to an engine (not shown) and an elastic member 6 disposed between the frame bodies 2 and 4 so as to form a closed chamber as mentioned later.

The frame body 2 comprises a rigid bottom plate 10 provided at the lower central side with a fitting bolt 12 protruding downward, and a cylindrical shell 14 fixed to the outer periphery of the bottom plate 10 by caulking or the like at the lower end portion. Further, an elastic diaphragm 16 is clamped at the outer peripheral portion between the bottom plate 10 and the cylindrical shell 14, which forms an air chamber 18 together with the bottom plate 10. In this case, the elastic diaphragm 16 is deformable in a direction of expanding and reducing the air chamber 18. Moreover, the air chamber 18 may communicate with an exterior through a hole 20 formed in the bottom plate 10.

To the upper portion of the cylindrical shell 14 is bonded an elastic member 6 made of, for example, a hollow rubber body by vulcanization at its lower peripheral end portion. The elastic member 6, use may be made of other elastomeric materials in addition to rubber.

The frame body 4 comprises a rigid top plate 22 provided at its central upper surface with a fitting bolt 24 and at its central lower surface with a cup-like member 26. To the lower surface of the top plate 22 and the outer peripheral surface of the cup-like member 26 is bonded the elastic member 6 by vulcanization at its upper peripheral end portion.

A closed chamber defined between the elastic member 6 and the elastic diaphragm 16 is a liquid chamber 30, which is filled with an incompressible liquid such as water or the like.

The liquid chamber 30 is divided by a partition member 32 into two small liquid chambers 30A and 30B. The partition member 32 comprises a cylindrical member 34 and a vibration insulating unit 36 fixed at its outer periphery to the inner periphery of the cylindrical member 34. The cylindrical member 34 is clamped at its outer peripheral end between the elastic diaphragm 16 and the bottom of the elastic member 6.

As shown in FIG. 2, the vibration insulating unit 36 comprises a disc-like perforated rigid plate 40 provided at upper and lower surfaces with circular depressions 42 and 44 and at the center with a through-hole 46, and a pair of flexible diaphragms 56 and 58 each made of rubber and secured at its peripheral portion to each of the upper and lower surfaces of the rigid plate 40 so as to cover each of the depressions 42 and 44. Thus, the spaces of the depressions 42 and 44 and the through-hole 46 defined between the flexible diaphragms 56 and 58 form an airtight chamber.

The rigid plate 40 is further provided at its outer periphery with an annular groove 48 extending circumferentially. Further, a notch 50 is formed in one of groove side walls facing the liquid chamber 30A, while a notch 52 is formed in the other groove side wall facing the liquid chamber 30B at a position rotating from the position of the notch 50 in a 180-degree arc. When the vibration insulating unit 36 is inserted into the cylindrical member 34, the notches 50 and 52 and the groove 48 form a restricted passage communicating the liquid chambers 30A and 30B with each other.

In the vibration insulating unit 36, the thin portion of the rigid plate 40 between the depressions 42 and 44 serves as a deformation-restricting means to restrict the deformation amount of the flexible diaphragm 56 or 58.

The vibration isolating device of the aforementioned structure is mounted on the automobile vehicle by fixing the bottom plate 10 to the vehicle chassis through the bolt 12 and carrying the engine on the top plate 22 through the bolt 24. In the attaching of the engine, the dead weight of the engine is applied to the bolt 24 to increase the pressure inside the liquid chamber 30A, which is transmitted to the liquid chamber 30B through the restricted passage (50-48-52) to reduce the air chamber 18.

In the operation of the engine, vibrations generated from the engine are transmitted to the vibration isolating device through the top plate 22. As a result, the vibration can be absorbed by the damping performance of the elastic member 6 based on the internal friction thereof. If the frequency of the vibration is low and its amplitude is large, the pressure rise in the liquid chamber 30A is transmitted to the flexible diaphragm 56 and consequently the flexible diaphragm 56 is forcedly pushed toward the bottom of the depression 42 and falls thereon as shown in FIG. 3. As a result, the damping effect can be enhanced by the flow resistance subjected to the liquid flowing through the restricted passage. Moreover, the flexible diaphragm 58 is subjected to the deformation of the flexible diaphragm 56 through the through-hole 46 to deform in a direction shown in FIG. 3.

When the vibration of the engine has a high frequency of, for example, more than 50 Hz and a small amplitude, there is a possibility that the restricted passage (50, 48, 52) becomes a clogged state. In this case, however, the flexible diaphragm 56 or 58 in the vibration insulating unit 36 can slightly move by the pressure rise inside the liquid chamber 30A in up and down directions. As a result, the change in volume of the liquid chamber 30A or 30B is produced by the slight movement of the flexible diaphragm 56 or 58, whereby the pressure rise is suppressed to absorb the vibration.

In the first embodiment of FIG. 1, vibrations having a wide frequency range can be absorbed by the action of the partition member provided with the vibration insulating unit, whereby the ride comfortability on the automobile vehicle can be enhanced. Particularly, in the illustrated vibration isolating device, the dynamic spring rate does not rise as compared with the conventional devices, so that the clogging phenomenon is hardly caused.

In FIG. 5 is shown a second embodiment of the vibration isolating device according to the invention. This device is a modified embodiment of the vibration isolating device shown in FIG. 1. As shown in FIG. 5, the frame body 2 comprises a rigid bottom plate 10 provided at the center with a deep concave protruding downward for forming a large air chamber 18 and a rigid annular disc 60 fixed to the upper surface of the flange portion of the bottom plate 10 through fitting bolts 12. In this case, the outer peripheries of the elastic diaphragm 16 and the cylindrical member 34 are clamped together between the bottom plate 10 and the annular disc 60. Further, the elastic member 6 made of a hollow cylindrical rubber body is bonded by vulcanization to the upper surface of the annular disc 60 and the lower surface of the top plate 22, respectively.

In the second embodiment of the above mentioned structure, the same effects as in the first embodiment can be obtained.

Figure 6:
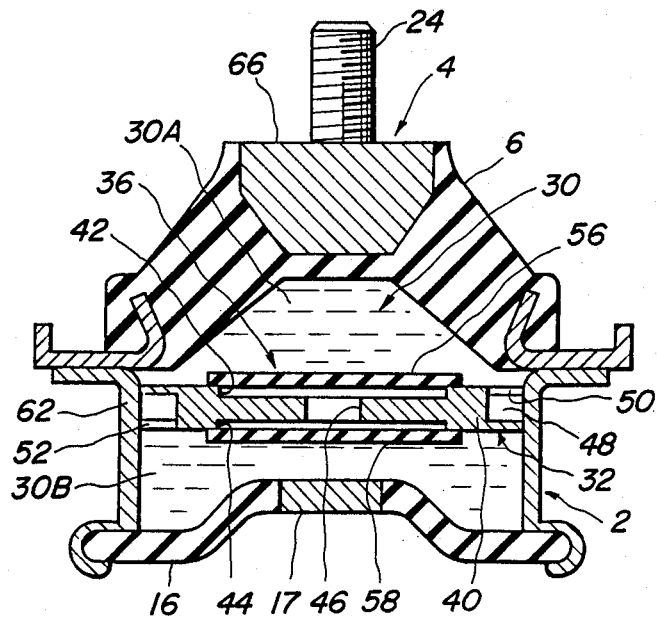

In FIG. 6 is shown a third embodiment of the vibration isolating device according to the invention, which is another modified embodiment of FIG. 1. The frame body 2 comprises a hollow cylindrical rigid plate 62 provided at both ends with flange portions extending outward and a rigid annular disc 64 fixed to the upper flange portion of the rigid plate 62 and provided at both ends with flange portions extending upward. The elastic diaphragm 16 is provided at the central portion with a metallic weight 17 for the improvement of frequency characteristics and secured at the outer periphery to the lower flange portion of the rigid body 62 by caulking. Further, the elastic member 16 is bonded by vulcanization to the inner flange portion of the annular disc 64 and an outer peripheral surface of a solid member 66 constituting the frame body 4, respectively. In this illustrated embodiment, the vibration insulating unit 36 itself constitutes the partition member 32 and is fixed to the inner periphery of the solid member 62.

Even in the third embodiment, the same effects as in the first embodiment can be attained.

In FIG. 7 is shown a fourth embodiment of the vibration isolating device according to the invention. The frame body 2 comprises a dish-like plate member 10 provided at the center with a fitting bolt 12 extending downward, and a cylindrical shell 14 fixed to the plate member 10 by caulking a lower end flange 14a to a flange portion 10a. While, the frame body 4 comprises a flat plate member 22 provided at the center with a fitting bolt 24 extending upward, and a cup-like member 26 fixed to the lower surface of the plate member 22.

The elastic member 6 made of rubber or rubbery elastomeric material has substantially a hollow frusto-conical form and is bonded by vulcanization at the lower surface to an upper enlarged portion 14b of the cylindrical shell 14 and at the upper surface to the outer peripheral surface of the cup-like member 26.

The elastic member 6 forms a closed chamber 30 together with the cylindrical shell 14, the cup-like member 26 and an elastic diaphragm 16 clamped at the outer periphery between the cylindrical shell 14 and the plate member 10. In this closed chamber 30 is filled an incompressible liquid having a given viscosity such as water or the like.

The closed chamber 30 filled with the liquid is divided into two liquid chambers 30A and 30B by a partition member 80 liquid-tightly clamped at the outer peripheral portion between the plate member 10 and the cylindrical shell 14. As shown in FIGS. 7 and 8, the partition member 80 comprises an outer sleeve 82 having inward and outward flanges 82a, 82b and an inner sleeve 84 having inward and outward flanges 84a, 84b, and a vibration insulating unit 90 clamped between the inward flanges 82a and 84a. The vibration insulating unit 90 comprises a deformation-restricting perforated rigid plate 92 made of, for example, a synthetic resin, a pair of flexible diaphragms 94 and 96 each made of rubber and arranged from the deformation-restricting plate 92 in up and down directions at given intervals, and annular metallic flanges 98 and 100 bonded to the outer peripheral portions of the flexible diaphragms 94 and 96 by vulcanization and integrally united with each other by caulking.

In the vibration insulating unit 90, a closed space defined between the flexible diaphragms 94 and 96 through openings 92a of the deformation-restricting plate 92 is filled with a desired liquid such as water or the like. Therefore, the liquid filling this closed space permits to freely move in up and down directions through the openings 92a in accordance with the movement of the flexible diaphragm 94 or 96.

The vibration insulating unit 90 is placed at the caulked portion between the inward flanges 82a and 84a, because end portions of the flexible diaphragms 94 and 96 and the deformation-restricting plate 92 are unfavorably fused when the caulked portion between the metallic flanges 98 and 100 is secured to the inward flanges 82a and 84a by spot welding. As shown in FIG. 8, therefore, plural projections 82c are arranged in the outward flange 82b at given intervals in the circumferential direction, while plural holes 84c fitting the respective projections 82c are arranged in the outward flange 84b in place. Moreover, the arrangements of the projection and hole may be made converse. When the outward flange 82b of the outer sleeve 82 is piled on the outward flange 84b of the inner sleeve 84 in place, each of the projections 82c passes through each of the corresponding holes 84c, so that the outer sleeve 82 is joined to the inner sleeve 84 by caulking the tips of the projections 82c protruded over the holes 84c. The outer periphery of the joint portion between the outward flanges 82b and 84b is clamped together with the outer periphery of the elastic diaphragm 16 between the plate member 10 and the cylindrical shell 14.

When the partition member 80 is manufactured by assembling the outer sleeve 82, inner sleeve 84 and the vibration insulating unit 90, an annular space is defined by the outer sleeve 82, the inner sleeve 84 and the caulked portion in the vibration insulating unit 90, which serves as a restricted passage 102. For this purpose, openings 104 and 106 are formed in the outer sleeve 82 and inner sleeve 84 at given positions opposed to each other in radial direction, respectively. As a result, the liquid chamber 30A communicates with the liquid chamber 30B through the openings 104 and 106 and the restricted passage 102. The positions of the openings 104 and 106 may properly be selected in accordance with the required length of the restricted passage 102. Moreover, the restricted passage communicating the liquid chambers 30A and 30B with each other may be arranged in the closed chamber 30 independently of the partition member 80.

In the fourth embodiment of FIG. 7, when low frequency, large amplitude vibrations are transmitted from an engine (not shown) to the frame body 4, a part of the vibration is damped by the internal friction of the elastic member 6, while the remaining part of the vibration is sufficiently and effectively damped by the flow resistance and liquid column resonance subjected to the liquid flowing from one of the liquid chambers 30A and 30B to the other through the restricted passage 102 based on the alternative increase and decrease of the pressure inside the liquid chambers 30A and 30B.

During such flow, the liquid flowing from the liquid chamber 30A into the liquid chamber 30B brings about an increase in the volume of the liquid chamber 30B corresponding to the decrease in the volume of the liquid chamber 30A based on the elastic deformation of the elastic diaphragm 16. Therefore, when a through-hole is arranged in the plate member 10 for communicating the air chamber 18 with air, the flow of the liquid can be performed more smoothly because the back pressure acting to the elastic diaphragm 16 lowers.

In the alternate flowing of the liquid between the liquid chambers 30A and 30B, the flexible diaphragms 94 and 96 in the vibration insulating unit 90 are alternatively deformed to the deformation-limiting position by pushing to the deformation-restricting plate 92 as shown in FIG. 8.

On the other hand, when high frequency, small amplitude vibrations are transmitted to the frame body 4, if the restricted passage 102 is in a clogged state, the flexible diaphragms 94 and 96 are deformed to a low pressure side in response to the change of pressure in the liquid chambers 30A and 30B, so that the frame body 4 is sufficiently permitted to vibrate relative to the frame body 2 without causing the increase and decrease of pressure in the liquid chambers. Thus, the sufficient insulation of high frequency, small amplitude vibrations to the vehicle chassis is attained without increasing the dynamic spring rate of the vibration isolating device.

The deformation of the flexible diaphragms 94 and 96 is carried out in a slight gap defined between the deformation-restricting plate 92 and the flexible diaphragm 94 or 96 or a gap capable of sufficiently absorbing frequencies, small amplitude vibration and effectively damping the low frequency, large amplitude vibration. Thus, the deformation of the flexible diaphragm 94 and 96 is restricted by pushing either one of these diaphragms to the deformation-restricting plate 92 under such a state that the liquid filled in the vibration insulating unit 90 freely passes through the openings 92a of the deformation-restricting plate 92. Since the volume of liquid in the vibration insulating unit 90 is unchanged before and after the deformation of the flexible diaphragms 94 and 96, there is developed the deformation of the flexible diaphragm 94 or 96 as a displacement phenomenon of the vibration insulating unit 90 bordering on the deformation-restricting plate 92.

In FIGS. 9 and 10 are shown another embodiments of the partition member used in the invention, respectively, which are modified embodiments of the partition member shown in FIG. 7. For the purpose of facilitating the manufacture of the vibration insulating unit and the assembling thereof into the partition member, the flexible diaphragm of the vibration insulating unit is a perforated rubber diaphragm.

Figure 9A:
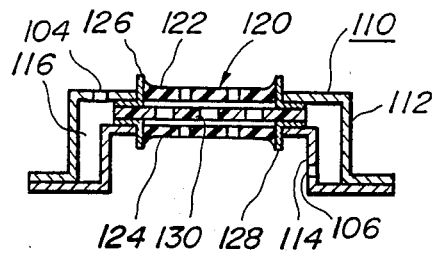
FIGS. 9a and 10a are sectional views of another embodiments of the partition member provided with the vibration insulating unit according to the invention, respectively.
Figure 9B:
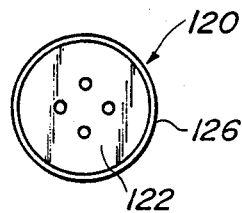
FIGS. 9b and 10b are plan views of the vibration insulating unit shown in FIGS. 9a and 10a, respectively.

In the embodiment of FIGS. 9a and 9b, the partition member 110 comprises an outer sleeve 112 and an inner sleeve 114 having substantially the same structure as in FIG. 7, and a vibration insulating unit 120 put between inward flanges of the outer and inner sleeve 112 and 114. The vibration insulating unit 120 comprises a pair of perforated flexible diaphragms 122 and 124 each made of rubber and bonded at the outer peripheral surface to a flange 126 or 128 made of a metal or a synthetic resin, and a deformation-restricting perforated plate 130 made of a metal or a synthetic resin and sandwiched between the flexible diaphragms 122 and 124 at a given interval. As shown in FIG. 9b, each of the flexible diaphragms 122 and 124 has four small openings. Therefore, a space defined between the flexible diaphragms 122 and 124 in the vibration insulating unit 120 communicates with both the liquid chambers 30A and 30B through the openings formed in the flexible diaphragms 122 and 124 and the deformation-restricting plate 130 each having a sectional area considerably smaller than that of a restricted passage 116 defined between the outer sleeve 112 and the inner sleeve 114. In this case, the action of the partition member 110 is the same as described in the aforementioned embodiments.

Figure 10A:
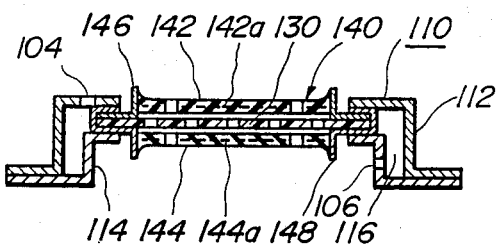
Figure 10B:
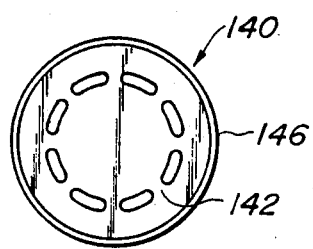

The embodiment shown in FIGS. 10a and 10b is a modified embodiment of FIGS. 9a and 9b. In this case, a vibration insulating unit 140 is placed between the inward flanges of the outer and inner sleeves 112 and 116 and comprises a pair of perforated flexible rubber diaphragms 142 and 144 each reinforced with a reinforcing layer 142a or 144a made of cord or canvas and bonded at the outer peripheral surface to a metal flange 146 or 148, and the deformation-restricting perforated plate 130. The flexible diaphragms 142 and 144 and deformation-restricting plate 130 are integrally united with each other by caulking one of the flanges 146 and 148 to the other. As shown in FIG. 10b, each of the flexible diaphragms 142 and 144 has eight small openings.

In the embodiment of FIGS. 10a and 10b, the perforated flexible diaphragms 142 and 144 are reinforced with the reinforcing layers 142a and 144a, respectively, so that the occurrence of cracks from peripheral edges of the openings formed in the diaphragms 142 and 144 is prevented to enhance the durability of these diaphragms.

Figure 11A:
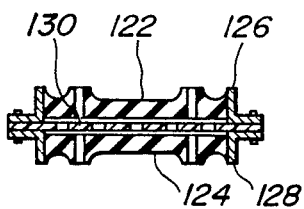
FIGS. 11a and 11b are sectional and perspective views of another embodiment of the vibration insulating unit according to the invention, respectively.
Figure 11B:
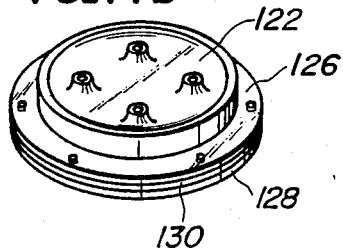

As shown in FIGS. 11a and 11b, the assembling of the flexible diaphragms 122 and 124 may be carried out by rivetting or bolting the flanges 126 and 128 together with the deformation-restricting plate 130. Further, the occurrence of cracks from the peripheral edge portions of the openings may be prevented by making the peripheral portion of each of the openings thick to increase the strength of that portion as shown in FIGS. 11a and 11b.

Figure 12:
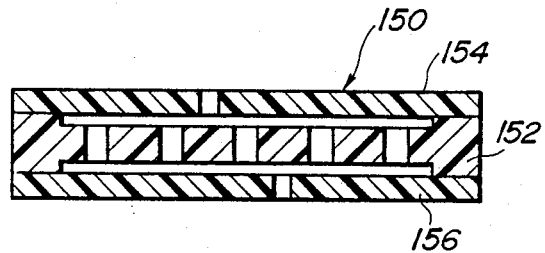
FIGS. 12 and 13 are sectional views of the other embodiments of the vibration insulating unit according to the invention, respectively.
Figure 13:
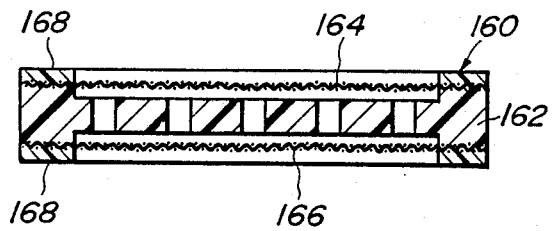

In FIGS. 12 and 13 are shown further embodiments of the vibration insulating unit according to the invention, respectively. In the embodiment of FIG. 12, the vibration insulating unit 150 comprises a deformation-restricted perforated rigid plate 152 made of a rigid plastic and a pair of flexible diaphragms 154 and 156 each made of a flexible plastic and bonded at their outer peripheries to the upper and lower surfaces of the rigid plate 152 by heat fusion or through an adhesive. Moreover, at least one opening may be formed in each of the diaphragms as shown in FIG. 12. In the embodiment of FIG. 13, the vibration insulating unit 160 comprises a deformation-restricting perforated rigid plate 162 made of a synthetic resin, a pair of flexible diaphragms 164 and 166 each made of a woven fabric, knitted goods or the like having a proper interstice and arranged at their outer peripheral portions on the upper and lower surfaces of the rigid plate 162, and a pair of synthetic resin rings 168 bonded to the upper and lower surfaces of the rigid plate 162 through the flexible diaphragms. These vibration insulating units 150 and 160 have the same function as in the previously mentioned embodiments.

As mentioned above, in the vibration isolating device according to the invention, the vibration insulating unit is arranged in the partition member for dividing a closed chamber into two liquid chambers, so that vibrations having a wider frequency range can effectively be damped. Particularly, there can effectively be prevented the increase of dynamic spring rate in the device against high frequency, small amplitude vibrations.

What is claimed is:

1. A vibration isolating device comprising: two bodies connected to separate members, an elastic member disposed between the two frame bodies to form a closed chamber, a partition member secured at its peripheral edge to one of the two frame bodies and dividing the closed chamber into two small chambers, at least one restricted passage arranged in the partition member to establish liquid communication of the two small chambers with each other, wherein the partition member is further provided with a vibration insulating unit comprising a pair of flexible diaphragms each made of rubber and having at least one opening, and a perforated rigid plate sandwiched therebetween; each of said flexible diaphragms secured at its peripheral portion to said rigid plate, said flexible diaphragms spaced apart at central portions thereof from said rigid plate and deformable to oscillate in a direction substantially perpendicular to the plane of said rigid plate during high frequency small amplitude vibrations to suppress the rise of dynamic spring rate; and said restricted passage is arranged in at least a portion of said partition member around said vibration insulating unit.

2. The device of claim 1, further comprising flange means and wherein each of said flexible diaphragms is secured at its peripheral portion to said flange means, and said flange means is in turn secured to said rigid plate.

3. The device of claim 2, wherein said flange means comprises upper and lower circumferential flanges, each of said flanges having an outer peripheral portion to which an edge of a diaphragm is bonded and a radially extending portion engaging said rigid plate.

4. The device of claim 1 wherein one surface of each of said flexible diaphragms faces one of said small chambers.

* * * * *